United States Patent
Shinzato et al.

(12)
(10) Patent No.: US 6,777,396 B2
(45) Date of Patent: Aug. 17, 2004

(54) FEED FOR LIVESTOCK

(75) Inventors: Izuru Shinzato, Kanagawa (JP); Hiroyuki Sato, Kanagawa (JP); Yasuhiko Toride, Tokyo (JP); Makoto Takeuchi, Tokyo (JP)

(73) Assignee: Ajinomoto Co., Inc., Tokyo (JP)

( * ) Notice: Subject to any disclaimer, the term of this patent is extended or adjusted under 35 U.S.C. 154(b) by 71 days.

(21) Appl. No.: 09/864,251

(22) Filed: May 25, 2001

(65) Prior Publication Data

US 2002/0004096 A1 Jan. 10, 2002

(30) Foreign Application Priority Data

May 26, 2000 (JP) ........................................ 2000-155826

(51) Int. Cl.⁷ .......................................... A61K 31/7052
(52) U.S. Cl. ............................ 514/44; 514/42; 514/43; 514/45; 514/46; 562/563; 562/573; 424/442; 426/623
(58) Field of Search ................................. 514/4, 42–46; 424/16, 442; 562/563, 573; 426/623

(56) References Cited

U.S. PATENT DOCUMENTS 3,686,392 A * 8/1972 Hamada et al. ............... 424/16
5,756,761 A   5/1998 Dueppen et al.

FOREIGN PATENT DOCUMENTS

| GB | 1 068 446 | | 5/1967 | |
|----|-----------|---|--------|---|
| GB | 1 200 582 | | 7/1970 | |
| GB | 1200582 | * | 7/1970 | ............ A23K/1/18 |
| GB | 002087888 | * | 7/1980 | ............ A23K/1/18 |

OTHER PUBLICATIONS

J.P. Felix D'Mello, Journal of the Science of Food and Agriculture, vol. 30, No. 4, pp. 381–387, "Purine and Pyrimidine Utilisation by Chicks Fed Nitrogen–Limiting Diets", 1979.
Derwent Publications, AN 1980–63376C, JP 55 099164, Jul. 28, 1980.
Derwent Publications, AN 1993–366058, RO 104 875, Dec. 30, 1992.
Derwent Publications, AN 1993–162112, JP 05 092944, Apr. 16, 1993.

* cited by examiner

*Primary Examiner*—James O. Wilson
*Assistant Examiner*—Ganapathy Krishnan
(74) *Attorney, Agent, or Firm*—Oblon, Spivak, McClelland, Maier & Neustadt, P.C.

(57) ABSTRACT

A composition for livestock feed, comprising a feed for livestock and at least two additives selected from the group consisting of nucleic acid, glutamine and glutamic acid; and a method for increasing body weight gain efficiency and feed efficiency in livestock, comprising administering the above composition for livestock feed to livestock.

19 Claims, No Drawings

FEED FOR LIVESTOCK

BACKGROUND OF THE INVENTION

1. Field of the Invention

The present invention relates to a feed for improving body weight gain efficiency and feed efficiency in livestock.

2. Background Art Relating to the Invention

Troubles during the juvenile period can be exemplified as characteristic problems in breeding industrial animals. For example, during the period from just after birth to just before the change of the feed to a grower diet via the weaning period, feed intake of animals is reduced due to influence of the stress caused by the dietary change from mother's milk to solid feed. In addition to this, it is known that various stresses such as diarrhea, various infections, changes in environment and dense rearing etc., induce reduction of feed intake and become a factor for retarded growth of animals. Since such a delay of growth becomes a cause of industrially serious loss, various attempts have been made as its countermeasure. For example, feeding of a diet supplemented with a material having high palatability, such as a sweetener, has been attempted particularly in order to increase feed intake, but distinct effects have not been observed yet.

As characteristic findings caused by these stresses, reduction of small intestinal functions due to atrophy of small intestinal villi can be exemplified. It is said that a physical factor and a chemical factor, namely a physical stimulus to the mucous membrane by the intake of solid feed and a chemical stimulus by nutrient substances, are concerned in the growth of villi, but it is unclear about which of them has large contribution. In any case, however, it can be easily imagined that absorption of nutrient substances cannot sufficiently be effected under atrophy of villi and, as a result, feed efficiency is reduced and delay of body weight gain takes place.

Several findings have been reported stating that when atrophy of small intestinal villi was experimentally effected in experimental animals, recovery of the villi was accelerated by the administration of nucleic acid (*Nutrition*, Vol. 13, No. 4 (1997); *J. Nutr.*, 125: 42–48 (1995); *JPEN*, 14: 598–604 (1990)). These reports suggests that the addition of nucleic acid to feed as a substrate for nucleic acid synthesis is effective on tissues which require rapid cell proliferation, such as intestinal villi. In addition, since it is considered that de novo nucleic acid synthesis using amino acids as the substrate is immature in juvenile animals, it can be assumed that efficacy of the nucleic acid administration may be more pronounced in such a period of animals.

Also, it is presumed that mother's milk contains several factors in order to effect development and maintenance of small intestinal functions in children. Among them, glutamine is a principal free amino acid in mother's milk. Therefore, it is considered that this amino acid is essential for the development and maintenance of small intestinal functions in animals (*Nutrition Review*, 48: 297 (1990)). Also, since it has been reported that the concentration of free glutamine in mother's milk of a sow increases as the lactation progresses (*J. Nutr.*, 124: 415–424 (1994)), a possibility can be suggested that this amino acid is playing an important role in juvenile animals. In addition, since it is known that glutamine derived from feed is not only a main energy source for intestinal epithelial cells but also a precursor of nucleic acid, it is considered that this amino acid is an essential nutrient substance for maintaining morphology and function of normal mucous membrane of small intestine (*JPEN*, 11; 569–579 (1987); *Annu. Rev. Nutr.*, 11: 285–308 (1991); *JPEN*, 14: 237–243 (1990)).

Similarly to glutamine, glutamic acid is also a principal amino acid in mother's milk, and it has been reported, e.g., that this is the most abundant amino acid particularly in sow's milk (*Br. J. Nutr.*, 79: 129–131 (1998)). Also, studies on the function of glutamic acid in mucous membrane of small intestine has recently been accumulated, and it has been revealed that glutamic acid derived from feed is a main energy source for small intestine epithelial cells as well as glutamine, is a precursor of arginine and proline, and also is a material for the synthesis of glutathione (*Am. J. Physiol.*, 273: E408–E415 (1997); *J. Nutr.*, 126: 878–886 (1996); *J. Nutr.*, 128: 1249–1252 (1998); *J. Nutr.*, 130; 978S–982S (2000)). Based on these viewpoints, it is considered in recent years that glutamic acid is an amino acid essential for the maintenance of small intestinal functions.

From the above reports, it is presumed that each of nucleic acid, glutamine and glutamic acid may each independently have improving effects on small intestinal function to a certain degree. However, no information is available to date concerning effects of the combination use of at least two of them, such as nucleic acid and glutamine, nucleic acid and glutamic acid, glutamine and glutamic acid, and the like.

SUMMARY OF THE INVENTION

An object of the present invention is to provide a feed and method for improving body weight gain efficiency and feed efficiency in livestock.

This and other objects of the present invention have been accomplished by a composition for livestock feed, comprising a feed for livestock and at least two additives selected from the group consisting of nucleic acid, glutamine and glutamic acid.

Also, this and other objects of the present invention have been accomplished by a method for increasing body weight gain efficiency and feed efficiency in livestock, comprising administering the above composition for livestock feed.

DETAILED DESCRIPTION OF THE INVENTION

As a result of intensive studies, the present inventors have found that, when at least two additives selected from the group consisting of nucleic acid, glutamine and glutamic acid are added to a feed for livestock, such as ordinary feed for livestock, feed efficiency is improved and growth of livestock is accelerated in comparison with a case in which these additives are added each independently, thus resulting in the accomplishment of the present invention.

Also, as the feed for livestock according to the present invention, ordinary feeds for livestock can be used, and preferred examples include a milk replacer, a pre-starter feed and a starter feed. It is preferred that the nucleic acid is added in an amount from 0.01 to 2.5% by weight per feed weight, and the glutamine and glutamic acid are added in an amount from 0.05 to 2.5% by weight per feed weight. Namely, a mixture of at least two additives selected from the group consisting of nucleic acid, glutamine and glutamic acid are added in an amount from 0.05 to 5% by weight per feed weight.

It is preferred that the administering period of the composition for livestock feed is the weaning period, namely a period before and after 1 to 2 weeks of weaning.

The term "livestock" as used herein means industrial animals for milk, meat or leather production, such as cattle, swine, chicken, horse, turkey, sheep, goat, and the like.

The nucleic acid for use in the present invention is not a nucleic acid derived from cereals contained in feed and the like, but a nucleic acid existing as a single substance, or cells, such as bacteria, yeast, and the like, containing a large amount of nucleic acid. As the nucleic acid, deoxyribonucleic acid and ribonucleic acid are effective. The nucleic acid can be used not only as a so-called polymer nucleic acid but also in the form of nucleotides as its composing units, nucleosides formed from nucleotides by dephosphorylation, and purine or pyrimidine bases as the minimum unit. Examples of the nucleotide include adenosine monophosphate, guanosine monophosphate, cytidine monophosphate, uridine monophosphate, thymidine monophosphate, inosine monophosphate, and the like. Examples of the nucleoside include compounds resulting from dephosphorylation of these nucleotides. Also, adenine and guanine can be exemplified as the purine base, and cytosine, uracil and thymine as the pyrimidine base.

The glutamine and glutamic acid for use in the present invention are not glutamine and glutamic acid derived from protein molecules contained in feed, but glutamine and glutamic acid existing as free amino acids. The glutamine and glutamic acid can be used as L-isomer or D-isomer, but L-isomer is preferred from the viewpoint of utilization efficiency. Regarding the glutamine and glutamic acid as free amino acids, glutamine and glutamic acid produced by a synthesis method, an extraction method or a fermentation method can be used, but the origin is not particularly limited.

Examples of the feed for livestock to which at least two additives selected from the group consisting of nucleic acid, glutamine and glutamic acid are to be added include cereals (e.g., corn, barley, wheat, rye, sorghum, soybean, yellow powdered soybean etc.), soybean meal, isolated soybean protein, oils and fats, skimmed milk, fish meal, meat and bone meal, blood meal, blood plasma protein, whey, rice bran, wheat bran, sweeteners such as saccharides (e.g., sugar etc.) and the like, minerals, vitamins and salt, and they can be used alone or in combination. Also, in ruminants such as cattle, sheep and goat, various grasses are used as forage in addition to the above feed.

The nucleic acid is added to the feed in an amount from 0.01 to 2.5% by weight, preferably from 0.05 to 1.0% by weight, per feed weight.

The glutamine and glutamic acid are usually added to the feed in an amount from 0.05 to 2.5% by weight, preferably from 0.5 to 2.0% by weight, per feed weight.

Furthermore, a mixture of at least two additives selected from the group consisting of nucleic acid, glutamine and glutamic acid is usually added in an amount from 0.05 to 5% by weight, preferably from 0.5 to 2.5% by weight, per feed weight.

It is preferred to provide livestock with the composition for livestock feed at such a dose that nucleic acid is ingested in an amount from 0.01 to 2.5 g/day, preferably from 0.05 to 1.0 g/day, per kg body weight of each animal, and glutamine and glutamic acid in an amount from 0.05 to 2.5 g/day, preferably from 0.5 to 2.0 g/day, per kg body weight of each animal.

Also, since it is generally considered that the requirement for nucleic acid is met almost entirely by biological synthesis, the amount of nucleic acid supplied from feed has not been concerned. Accordingly, though analytical values of the nucleic acid content of respective feed materials are mostly unclear, it is generally said that the amount of the nucleic acids derived from these feed materials is extremely small. On the other hand, it is usual that the glutamine content of feed materials is not measured, because glutamine in feed is converted to glutamic acid during the hydrolysis process of feed materials. Thus, the amount of glutamine derived from feed is generally measured as the total amount of glutamine and glutamic acid, and it is considered that the total amount occupies 10 to 15% of the total protein in feed. Based on this, it is considered that the practical feed contains glutamine and glutamic acid, at a ratio approximately from 1.5 to 4.0% weight (in total) per feed weight.

At least two additives selected from the group consisting of nucleic acid, glutamine and glutamic acid can be fed to livestock by supplementing and mixing with the feed. In the case of a swine, for example, sow's milk alone is fed just after birth, but a pre-starter diet is fed starting 1 to 2 weeks thereafter as well as sow's milk. After weaning, the feed is changed to a starter diet and then to a grower diet to carry out fattening. Also, in ruminants, such as cattle, sheep, goat, and the like, mother's milk or a milk replacer and a solid feed are simultaneously fed until formation of rumen, and they are completely switched to the solid feed at the time of weaning. The nucleic acid, glutamine and glutamic acid can improve body weight gain efficiency and feed efficiency when added to any feed. However, since the effect to improve body weight gain and feed efficiency by the feeding of the diet supplemented with at least two additives selected from the group consisting of nucleic acid, glutamine and glutamic acid persists even after termination of the feeding of the diet, feeding particularly during a period before and after 1 to 2 weeks of weaning is more effective. The nucleic acid, glutamine and glutamic acid can be fed not necessarily by mixing in feed but be fed each independently, in the form of a mixed powder or by mixing with a livestock's favorite substance, such as sugar or the like. Alternatively, they can be fed as a liquid by dissolving in a milk replacer or water.

The at least two additives selected from the group nucleic acid, glutamine and glutamic acid may be added to a feed either when mixing the feed in advance or when feeding the diet to livestock.

From the industrial point of view, the method of the present invention for improving body weight gain efficiency and feed efficiency using the livestock feed supplemented with at least two additives selected from the group consisting of nucleic acid, glutamine and glutamic acid is useful when applied to livestock in the period from just after birth to just before the change of the feed to a grower diet via the weaning period, and is particularly useful when applied to pigs.

According to the present invention, the body weight gain efficiency and feed efficiency in livestock can be improved, so that certain effects, such as increase in body weight, can be obtained as a result.

The present invention will be explained with reference to Examples, but is not limited thereto. Unless otherwise indicated, the term "%" means "% by weight".

EXAMPLE 1

Improvement in Feed Efficiency in Piglets

Weaned piglets, 72 barrows and 72 gilts were used and divided into 4 groups (36 animals for each group, 6 replications with 6 animals per replication), namely a control group (C), a nucleic acid alone administration group (N), a glutamine alone administration group (G) and a nucleic acid+glutamine mixture administration group (N+G). Piglets were weaned at 17 days of age in average. For 2 weeks after weaning, the C group was provided with a starter feed having the composition shown in Table 1. Also, the N group was provided with an experimental feed prepared by adding commercially available ribonucleic acid extracted from beer yeast (manufactured by Kirin Brewery CO., LTD.) at 0.8% per feed weight to the starter feed, the G group with an experimental feed prepared by adding crystalline glutamine at 1.2% per feed weight to the starter feed, and the N+G group with an experimental feed prepared by adding ribonucleic acid and glutamine at 0.8% and 1.2%, respectively, per feed weight to the starter feed. After two weeks passed, a common diet was fed to all groups. Body weight and residual feed weight were measured to calculate feed intake, body weight gain and feed efficiency on the 7th, 14th, 21st and 28th days after the weaning. The results are shown in Table 2.

TABLE 1

Formulation composition of starter feed

| Material | Formulation ratio (%) |
|---|---|
| Lactose | 30.0 |
| Corn | 20.1 |
| Soybean meal | 24.3 |
| Concentrated soybean protein | 10.6 |
| Corn starch | 1.2 |
| Dried red blood cells | 1.8 |
| Tallow | 7.4 |
| Others | 4.6 |
| Total | 100.0 |

TABLE 2

Test results

|  | C | N | G | N + G |
|---|---|---|---|---|
| Average body weight (kg) | | | | |
| at the time of weaning | 5.36 | 5.36 | 5.36 | 5.37 |
| 7 days after weaning | 6.14 | 6.17 | 6.01 | 6.42 |
| 14 days after weaning | 8.07 | 8.28 | 7.83 | 8.68 |
| 21 days after weaning | 10.11 | 10.20 | 9.91 | 11.05 |
| 28 days after weaning | 12.98 | 13.23 | 12.82 | 14.09 |
| Body weight gain (kg/day) | | | | |
| 0 to 7 days | 0.111 | 0.116 | 0.094 | 0.151 |
| 7 to 14 days | 0.276 | 0.301 | 0.259 | 0.322 |
| 14 to 21 days | 0.292 | 0.274 | 0.297 | 0.340 |
| 21 to 28 days | 0.410 | 0.432 | 0.416 | 0.433 |
| 0 to 28 days | 0.272 | 0.281 | 0.267 | 0.311 |
| Average feed intake (kg/day) | | | | |
| 0 to 7 days | 0.154 | 0.159 | 0.147 | 0.181 |
| 7 to 14 days | 0.370 | 0.377 | 0.363 | 0.412 |
| 14 to 21 days | 0.593 | 0.525 | 0.546 | 0.575 |
| 21 to 28 days | 0.798 | 0.797 | 0.883 | 0.789 |
| 0 to 28 days | 0.478 | 0.463 | 0.480 | 0.489 |
| Feed efficiency (Feed kg/Gain kg) | | | | |
| 0 to 7 days | 1.509 | 1.392 | 1.639 | 1.223 |
| 7 to 14 days | 1.369 | 1.256 | 1.407 | 1.280 |
| 14 to 21 days | 2.074 | 1.945 | 1.830 | 1.711 |
| 21 to 28 days | 2.010 | 1.852 | 2.120 | 1.818 |
| 0 to 28 days | 1.773[ab] | 1.648[bc] | 1.799[a] | 1.570[c] |

[a,b,c]Statistically significant difference between different superscripts ($P < 0.05$)

During the whole test period (0 to 28 days after weaning), improvement in feed efficiency was not found in the G group compared to the C group. Also, though slight improvement in feed efficiency was found in the N group compared to the C group, the difference was not statistically significant. However, significant improvement in feed efficiency was found in the N+G group compared to the C group or G group. When compared on weekly basis, slight improvement in feed efficiency was also found in the N group compared to the C group, and the improvement tended to be bigger in the N+G group. In addition, it was found that these improving effects on body weight gain and feed efficiency were observed not only during the test feed-provided period (0 to 14 days) but also persisted during the period in which a common feed were fed to all groups after withdrawal of the test feed (14 to 28 days). As a result, though the average body weight at the onset of the study was almost the same in all groups, the average body weight after completion of the study in the N+G group was 14.09 kg, corresponding to more than 1 kg improvement in the body weight gain compared to 12.98 kg of the C group. Based on the above results, body weight gain efficiency and feed efficiency of weaned piglets were improved by the combined supplementation of nucleic acid and glutamine to the feed. Also, the effect to improve body weight gain efficiency and feed efficiency by the combined use of nucleic acid and glutamine was superior to that of the single addition of nucleic acid or glutamine. In addition, it was confirmed that this effect to improve body weight gain efficiency and feed efficiency remains after completion of the test feed provision.

EXAMPLE 2

Improvement in Body Weight Gain Efficiency and Feed Efficiency in Piglets 120 weaned barrows were used and divided into 4 groups (30 animals for each group, 6 replications with 5 animals per replication), namely a control group (C), a nucleic acid alone administration group (N), a glutamic acid alone administration group (G) and a nucleic acid+glutamic acid mixture administration group (N+G). Piglets were weaned at 17 days of age in average. For 2 weeks after weaning, the C group was provided with a starter feed having the composition shown in Table 3. Also, the N group was provided with an experimental feed prepared by adding commercially available ribonucleic acid extracted from beer yeast (manufactured by Kirin Brewery CO., LTD.) at 0.8% per feed weight to the starter feed, the G group with an experimental feed prepared by adding crystalline glutamic acid at 1.2% per feed weight to the starter feed, and the N+G group with an experimental feed prepared by adding ribonucleic acid and glutamic acid at 0.12% and 1.08%, respectively, per feed weight to the starter feed. Body weight and residual feed weight were measured to calculate feed intake, body weight gain and feed efficiency on the 7th and 14th days after the weaning. The results are shown in Table 4.

TABLE 3

Formulation composition of starter feed

| Material | Formulation ratio (%) |
|---|---|
| Lactose | 15.0 |
| Corn | 41.6 |
| Soybean cake | 28.0 |
| Fish meal | 5.0 |
| Dried erythrocytes | 1.8 |
| Oil and fat | 3.0 |
| Minerals | 3.3 |
| Vitamins | 0.3 |
| Others | 2.0 |
| Total | 100.0 |

TABLE 4

Test results

|  | C | N | G | N + G |
|---|---|---|---|---|
| Body weight gain (kg/day) | | | | |
| 0 to 7 days | 0.107[b] | 0.102[b] | 0.092[b] | 0.121[a] |
| 8 to 14 days | 0.207 | 0.234 | 0.219 | 0.234 |
| Average feed intake (kg/day) | | | | |
| 0 to 7 days | 0.152[ab] | 0.151[ab] | 0.142[b] | 0.169[a] |
| 8 to 14 days | 0.290 | 0.291 | 0.308 | 0.300 |
| Feed efficiency (Feed kg/Gain kg) | | | | |
| 0 to 7 days | 1.431 | 1.490 | 1.553 | 1.408 |
| 8 to 14 days | 1.397 | 1.252 | 1.404 | 1.285 |

[a,b]Statistically significant difference between different superscripts (P < 0.05)

During 7 days just after weaning, the body weight gain per day in the N group and G group was not different from the C group, but the body weight gain per day in the N+G group was significantly larger than the other 3 groups. The feed intake during the same period was the smallest in the G group and the largest in the N+G group. Regarding the feed efficiency, no statistical difference was found among the test groups, but the N+G group tended to show the biggest improvement in the efficiency. During another 7 days (8 to 14 days after weaning), the body weight gain per day was the smallest in the C group and showed a tendency to increase in the G group and further increased in the N group and N+G group, but statistically significant difference was not found among these groups. The feed intake was almost the same in all groups. The feed efficiency showed a tendency to be improved in the N group and N+G group compared to the C group and G group, but the difference was not statistically significant. Based on the above results, body weight gain efficiency and feed efficiency of weaned piglets were improved by the combined supplementation of nucleic acid and glutamic acid to the feed. Also, the effect to improve body weight gain efficiency and feed efficiency by the combined use of nucleic acid and glutamic acid was superior to that of the single addition of nucleic acid or glutamic acid. In addition, it was confirmed that this effect to improve body weight gain efficiency and feed efficiency is pronounced particularly just after weaning while this tendency persists even 2 weeks after weaning.

EXAMPLE 3
Improvement in Body Weight Gain Efficiency and Feed Efficiency in Piglets 120 weaned barrows were used and divided into 4 groups (30 animals for each group, 6 replications with 5 animals per replication), namely a control group (C), a glutamine alone administration group (GLN), a glutamic acid alone administration group (GLU) and a glutamine+glutamic acid mixture administration group (GLN+GLU). Piglets were weaned at 17 days of age in average. For 2 weeks after weaning, the C group was provided with the same starter feed as that shown in Table 3 of Example 2. Also, the GLN group was provided with an experimental feed prepared by adding crystalline glutamine at 1.2% per feed weight to the starter feed, the GLU group with an experimental feed prepared by adding crystalline glutamic acid at 1.2% per feed weight to the starter feed, and the GLN+GLU group with an experimental feed prepared by adding glutamine and glutamic acid at 0.12% and 1.08%, respectively, per feed weight to the starter feed. After two weeks passed, a common feed was fed to all groups. Body weight and residual feed weight were measured to calculate feed intake, body weight gain and feed efficiency on the 14th and 21st days after the weaning. The results are shown in Table 5.

TABLE 5

Test results

|  | C | GLN | GLU | GLN + GLU |
|---|---|---|---|---|
| Body weight gain (kg/day) | | | | |
| 1 to 14 days | 0.157 | 0.147 | 0.156 | 0.161 |
| 15 to 21 days | 0.324 | 0.351 | 0.342 | 0.372 |
| Average feed intake (kg/day) | | | | |
| 1 to 14 days | 0.221 | 0.211 | 0.225 | 0.216 |
| 15 to 21 days | 0.456 | 0.446 | 0.459 | 0.466 |
| Feed efficiency (Feed kg/Gain kg) | | | | |
| 1 to 14 days | 1.414 | 1.439 | 1.453 | 1.344 |
| 15 to 21 days | 1.403 | 1.280 | 1.333 | 1.227 |

During 2 weeks from 1 day to 14 days after weaning, the body weight gain per day was the largest in the GLN+GLU group, intermediate in the C group and GLU group and the smallest in the GLN group, but statistical difference was not found among these groups. The feed intake during the same period was the largest in the GLU group, intermediate in the C group and GLN+GLU group and the smallest in the GLN group, but statistical difference was not found among these groups similarly to the case of body weight gain. Regarding the feed efficiency, no statistical difference was found among the treatments, but the GLN+GLU group tended to show higher efficiency than other three groups. During 7 days thereafter (15 to 21 days after weaning), the body weight gain per day was the smallest in the C group, tended to increase in the GLU and GLN groups and further increased in the GLN+GLU group. Regarding the feed efficiency, tendency was found to be improved in the GLN group and GLU group compared to the C group, and it tended to be further improved in the GLN+GLU group. Based on the above results, body weight gain efficiency and feed efficiency of weaned piglets were improved by the combined supplementation of glutamine and glutamic acid to the feed. Also, the effect to improve body weight gain efficiency and feed efficiency by the combined use of glutamine and glutamic acid was superior to that of the single addition of glutamine or glutamic acid. In addition, it was confirmed that this effect to improve body weight gain efficiency and feed efficiency persists even after the provision of the experimental feed was completed and all groups were fed a common diet.

EXAMPLE 4
Effect on Recovery of Small Intestinal Villi 24 weaned barrows were used and divided into 4 groups (6 animals for each group), namely a control group (C), a nucleic acid alone administration group (N), a glutamic acid alone administration group (G) and a nucleic acid+glutamic acid mixture administration group (N+G). Piglets were weaned at 17 days of age in average. For 1 week after weaning, the C group was provided with the same starter feed as shown in Table 3 of Example 2. Also, the N group was provided with an experimental feed prepared by adding commercially available ribonucleic acid extracted from beer yeast (manufactured by Kirin Brewery CO., LTD.) at 0.8% per feed weight to the starter feed, the G group with an experimental feed prepared by adding crystalline glutamic acid at 1.2% per feed weight to the starter feed, and the N+G group with an experimental feed prepared by adding ribonucleic acid and glutamic acid at 0.12% of and 1.08%, respectively, per feed weight to the starter feed. On the 7th day after weaning, all piglets were sacrificed to collect the small intestines. After the preparation of tissue sections from the collected small intestines by a general procedure, the length of villi and the thickness of crypt were measured using optical microscope. The results are shown in Table 6.

TABLE 6

|  | Test results | | | |
| --- | --- | --- | --- | --- |
|  | C | N | G | N + G |
| Duodenum | | | | |
| Villi length (μm) | 318[a] | 385[b] | 386[b] | 420[c] |
| Crypt thickness (μm) | 126[a] | 130[ab] | 127[a] | 138[b] |
| Jejunum | | | | |
| Villi length (μm) | 303[a] | 406[b] | 387[b] | 435[c] |
| Crypt thickness (μm) | 119[a] | 136[b] | 115[a] | 127[b] |
| Ileum | | | | |
| Villi length (μm) | 328[a] | 344[ab] | 361[b] | 400[c] |
| Crypt thickness (μm) | 118[a] | 128[b] | 116[a] | 128[b] |

[a,b,c]Statistically significant difference between different superscripts ($P < 0.10$)

On the 7th day after weaning, in duodenum, villi length of the N and G groups was significantly longer than that of the C group, and the villi length of the N+G group was significantly longer than that of the N and G groups. In jejunum and ileum, the villi length of the N+G group was also significantly longer than the other groups similarly to the case of the duodenum. Regarding the crypt thickness, it was significantly thicker in the N+G group than the C and G group in duodenum and was significantly thicker in the N group and N+G group than the C and G group in jejunum and ileum. Based on the above results, it was confirmed that the villi length becomes longer and the crypt thickness becomes thicker in weaned piglets when nucleic acid and glutamic acid are simultaneously added to the feed. In addition, this effect was evidently larger than the case of the single addition of nucleic acid or glutamic acid. Since this result is suggesting that the damage in morphology and functions of small intestinal tissues are the smallest in the N+G group, it is considered that this method is markedly helpful for the digestion and absorption of nutrient substances and prevention of infectious diseases in weaned piglets.

This application is based on Japanese application No. 2000-155826 filed on May 20, 2000, the entire content of which is incorporated hereinto by reference.

While the invention has been described in detail and with reference to specific embodiments thereof, it will be apparent to one skill in the art that various changes and modifications can be made therein without departing from the spirit and scope thereof. All references cited herein are incorporated in their entirety.

What is claimed is:

1. A composition for livestock feed, comprising
a feed for livestock and 0.05 to 5% by weight per feed weight of an additive mixture, wherein said additive mixture comprises at least two additives selected from the group consisting of (a), (b), and (c):
(a) at least one of a nucleic acid, a nucleotide, a nucleoside;
(b) glutamine; and
(c) glutamic acid wherein in said additive mixture, when present, the nucleic acid, nucleotide, or nucleoside is added in an amount of 0.01 to 2.5% by weight per feed weight, when present, the glutamine is added in an amount of 0.05 to 2.5% by weight per feed weight, and, when present, the glutamic acid is added in an amount of 0.05 to 2.5% by weight per feed weight.

2. The composition according to claim 1, wherein the feed for livestock is selected from the group consisting of a milk replacer, a pre-starter feed and a starter feed.

3. A method for increasing body weight gain efficiency and feed efficiency in livestock, comprising administering the composition for livestock feed of claim 1 to livestock.

4. The method according to claim 3, wherein the composition is administered in the weaning period.

5. The composition according to claim 1, wherein said livestock is selected from the group consisting of a cattle, a swine, a chicken, a horse, a turkey, a sheep, and a goat.

6. The composition according to claim 1, wherein said nucleic acid is a deoxyribonucleic acid or a ribonucleic acid.

7. The composition according to claim 1, wherein said nucleic acid, nucleotide, or nucleoside is selected from the group consisting of a polynucleotide, a nucleoside, a purine base, and a pyrimidine base.

8. The composition according to claim 1, wherein said nucleic acid, nucleotide, or nucleoside is selected from the group consisting of an adenosine monophosphate, a guanosine monophosphate, cytidine monophosphate, a uridine monophosphate, a thymidine monophosphate, an inosine monophosphate, adenine, guanine, cytosine, uracil and thymine.

9. The composition according to claim 1, wherein said feed is selected from the group consisting of a cereal, soybean meal, isolated soybean protein, isolated soybean oil, isolated soybean fat, skimmed milk, fish meal, meat meal, bone meal, blood meal, blood plasma protein, whey, rice bran, wheat bran, a sweetener, a mineral, a vitamin, salt, and grass.

10. The composition according to claim 1, wherein said feed is a cereal.

11. The composition according to claim 10, wherein said cereal is selected from the group consisting of corn, barley, wheat, rye, sorghum, soybean, yellow powdered soybean.

12. The method according to claim 3, wherein the daily dose of the nucleic acid, nucleotide, or nucleoside ranges from 0.01 to 2.5 g/day per kg body weight of the animal.

13. The method according to claim 3, wherein the daily dose of the nucleic acid, nucleotide, or nucleoside ranges from 0.05 to 1.0 g/day per kg body weight of the animal.

14. The method according to claim 3, wherein the daily dose of the glutamine or glutamic acid ranges from 0.05 to 2.5 g/day per kg body weight of the animal.

15. The method according to claim 3, wherein the daily dose of the glutamine or glutamic acid ranges from 0.5 to 2.0 g/day per kg body weight of the animal.

16. The method according to claim 4, wherein the daily dose of the nucleic acid, nucleotide, or nucleoside ranges from 0.01 to 2.5 g/day per kg body weight of the animal.

17. The method according to claim 4, wherein the daily dose of the nucleic acid, nucleotide, or nucleoside ranges from 0.05 to 1.0 g/day per kg body weight of the animal.

18. The method according to claim 4, wherein the daily dose of the glutamine or glutamic acid ranges from 0.05 to 2.5 g/day per kg body weight of the animal.

19. The method according to claim 4, wherein the daily dose of the glutamine or glutamic acid ranges from 0.5 to 2.0 g/day per kg body weight of the animal.

* * * * *